United States Patent Office 3,046,160
Patented July 24, 1962

3,046,160
PROCESS FOR TREATING PAPER WITH SILICONES
Ludwig Dengler, Nurnberg, Bavaria, Germany, assignor to Wacker-Chemie G.m.b.H., Munich, Bavaria, Germany
No Drawing. Filed Apr. 27, 1959, Ser. No. 808,891
Claims priority, application Germany Apr. 30, 1958
11 Claims. (Cl. 117—155)

The present invention relates to a process for coating paper with silicone products in order to obtain a certain anti-adhesive effect, which in papers used for releasing, interleaving, covering and protecting purposes particularly in the production of adhesive sheets and tapes, transfer-pictures and the like, is necessary but does not prevent temporary adhesion of the sheets, tapes and so forth to the papers.

It has already been known that paper can be made water-repellent and/or non-adhesive through the use of silicones. Papers treated with silicones can be used as intermediate layers, i.e. as easily removable separating layers, between sticky or auto-adhesive sheets or tapes. It has also been suggested to employ such papers as separating layers for wrapping and storing adhesive substances such as asphalt, rubber stocks, and polymerizates, in order to prevent their sticking to each other or to other materials such as the walls of containers.

Heretofore, paper has been treated with silicones by applying either silicone resin or silicone rubber. Either method, however, involves certain disadvantages and does not meet the requirements.

This invention relates to a method of treating paper with silicones in order to produce covering, protecting, and releasing sheets and tapes comprising applying a mixture of a room temperature vulcanizing silicone rubber and silicone resin to the paper.

The silicone rubber polymers operable in this invention consist of diorganopolysiloxanes as described in Belgian Patent No. 550,105, assigned to Wacker-Chemie, G.m.b.H., of Munich, Germany, assignee of the instant invention. The operable siloxanes are bifunctional, linear, highly condensed, non-resinous polysiloxanes of the average formula $XO[R_2SiO]_nX$ where each R is an alkyl radical or an aryl radical, each X is an alkyl radical, aryl radical or hydrogen atom and $n$ is at least 50. These polymers vary from fluids of 50 cs. viscosity at 25° C. to high molecular weight gums exhibiting almost no flow but remaining soluble in the organic solvents. For purposes of this invention the lower viscosity species, i.e. 50 to 50,000 cs. at 25° C. are preferred. Methods of preparing such polymers are well known in the art and are amply described in the literature. The best known of these polymers are those where X is methyl, ethyl or hydrogen and R is methyl, ethyl or phenyl. Most common is the hydroxy endblocked dimethylsiloxane.

The silicone rubber polymers operable herein can be vulcanized to elastomeric products by adding crosslinking agents and condensation catalysts thereto. The crosslinking agents and condensation catalysts operable are thoroughly described, defined and delineated in United States patent application Serial No. 602,081, filed August 3, 1956, assigned to the assignee of this application. Particularly useful as crosslinking agents are reactive organosilicon compounds such as tetraethylsilicic acid esters, methylhydrogenpolysiloxanes and silanes of the general formula $R_mSiY_{4-m}$ where R is alkyl radical or aryl radical, Y is hydroxyl, alkoxy, aryloxy, amino or other radical capable of condensation and $m$ is 0 to 1.5. Also operable are siloxanes prepared by partial hydrolysis and condensation of the silanes of the formula $R_mSiY_{4-m}$ as defined.

The condensation catalysts or hardening agents employed can be metal salts of organic acids, metal chelates, metal oxides and other organometallic compounds. Preferred as condensation catalysts are dialkyl tin diacylates such as dibutyl tin dilaurate and dibutyl tin dimaleinate.

The ratios of siloxane polymer, crosslinking agent and condensation catalyst can be widely varied depending upon such factors as degree of vulcanization desired, fluidity of polymer, temperature of vulcanization and so forth. In general, the best results are achieved with 0.5 to 10 parts by weight of crosslinking agent and 0.1 to 5 parts by weight of condensation catalyst per 100 parts by weight of the siloxane polymer. Preferably inorganic fillers, such as diatomaceous earth and clays, are added to this polymer in an amount of 50 to 200 percent by weight, calculated on the non-resinous polymer.

The silicone resins employed herein are well-known siloxane polymers of the general unit formula $$R_nSiO_{\frac{4-n}{2}}$$

where each R is an alkyl or aryl radical and $n$ has an average value of 1.0 to 1.7. The operable silicone resins vary from light fluids to viscous fluids (i.e. 1,000 cs. to 150,000 cs. at 25° C.). It is preferred to use a resin having a viscosity of 50,000 to 75,000 cs. at 25° C. (corresponding to 15 to 20 secs. measured in a Ford Cup No. 4). These resins are generally copolymers of $RSiO_{3/2}$ units and $R_2SiO$ units with limited amounts of $SiO_{4/2}$ units and $R_3SiO_{1/2}$ units tolerated. Preferably the ratio of R/Si is about 1.0/1 to 1.5/1. Best known are the commercially available methylsiloxane resins $$\left[(CH_3)_nSiO_{\frac{4-n}{2}}\right]$$

ethylsiloxane resins $$\left[(C_2H_5)_nSiO_{\frac{4-n}{2}}\right]$$

phenylsiloxane resins $$\left[(C_6H_5)_nSiO_{\frac{4-n}{2}}\right]$$

and methylphenylsiloxane resins $$\left[(C_6H_5)_a(CH_3)_bSiO_{\frac{4-a-b}{2}}\right]$$

The proportions of the two silicone components of the mixture of the invention can vary over a wide range. Such variables as the paper to be treated and the desired degree of impregnation are to be taken into account to establish the proper ratio of resin and rubber. Mixtures containing approximately equal parts by weight of silicone resin and silicone rubber are generally equally as suited as mixtures containing a preponderant proportion of one of the two components.

The silicone mixtures described are used to treat finished papers. The papers are impregnated or coated on one or both surfaces by any desired means. Papers have been successfully treated by immersion or soaking, sprinkling, flowing, and dipping and it is contemplated that any desired means of applying the mixtures to the paper is included within the scope of this invention. Also, the papers can be coated with the silicone mixture in the course of their production. Coating or impregnation can be carried out with commercial machines.

The intensity of the adhesive-repellent property of the coating and impregnation can easily be controlled by means of changing the concentration of the impregnating mixture or the proportions of silicone resin and silicone rubber.

The process of the invention is applicable to all sorts of paper, such as, for example, commercial soda paper or sulfite cellulose paper, kraft, rag, and rice paper, particularly parchment and pergamyn paper. Papers which are not sufficiently closely woven can, if necessary, be primed with any suitable substance such as, for example, a plastics impregnating agent.

Two methods can be employed in carrying out the new process. The treatment of the papers with silicones can be effected by using solutions or by using aqueous dispersions or emulsions of the mixtures of components.

Impregnation by means of a solution is easily carried out in the paper mill or in a paper processing factory. A low percent solution of a mixture of silicone resin and silicone rubber in an organic solvent is prepared, which solution contains suitable hardening agents. The solvents employed can be gasoline or aromatic hydrocarbons such as benzene, toluene, and xylene. Advantageously non-combustible solvents are employed, preferably chlorinated aliphatic hydrocarbons such as carbon tetrachloride, trichloroethylene, or perchloroethylene.

The paper to be treated is, for example, immersed into the impregnating solution for a short period of time. It is advantageous subsequent to the evaporation of the solvents to carry out a treatment by heat. The exact temperatures will depend on the resistance of the particular carrier to heat and can vary between room temperature and 130° C. and is preferably between 90° C. and 130° C. The heat impulse preferably starts the condensation of the silicone resin and the silicone rubber. Since the proportion of silicone rubber and silicone resin in the mixture on the one hand and the concentration of the entire mixture of impregnating agents on the other hand can be varied within a wide range by the addition of solvents, such as, for example, trichloroethylene, it is possible to govern the impregnation or coating according to the particular requirements. Moreover, chemical products can be added to the mixture of impregnating agents and solvents, which products are insoluble or soluble in the same types of solvents as the siloxanes used. Such chemical products are, for example, fillers such as bentonite and silicas, and coloring pigments or preserving preparations, soluble dyestuffs and the like. Thus special effects can be obtained.

Carrier sheets for transfer-pictures can be impregnated or coated in such a way that the color pastes to be used later on for printing are attached to the sheet but do not stick to it. Thus, after the transfer of the picture the carrier sheet can be easily removed with the hand.

Where papers are to be used as interleaving or separating layers between sticky surfaces it is advantageous to change the proportion of silicone rubber and silicone resin and to increase the concentration of the entire mixture of impregnating agents.

As a matter of course the subsequent treatment of finished paper with silicone solutions makes the manufacture of silicone-treated paper considerably more expensive. Therefore attempts have been made at carrying out a first-rate treatment of paper with silicones in the course of the manufacture of the paper, thus avoiding a separate process for the treatment with silicones.

Paper was tested which had been treated with silicones by subsequent impregnation with a resin-rubber solution. This paper was compared with paper which had been treated with a silicone resin emulsion in the paper machine, and it was found that the repellent properties of paper treated with the resin-rubber combination were far stronger than the repellent properties of paper treated with silicone resin.

It was found that paper having been treated in the course of its manufacture with a silicone resin emulsion showed interesting technical properties but was unlikely to be employed commercially on a larger scale. Although such paper is highly water-repellent it has no improved waterproofness. Greaseproofness may be increased by 100%, however, this is an expensive affair. Proofness against water steam and aromas is not affected.

An experiment was conducted as follows:

A methylsilicone resin emulsion having a 15% solids content was applied to a 40 grams pergamyn paper. A piece of about .9 sq. m. was cut out of the paper, and 200 grams of coarse sugar were poured into the middle of it. Then a bag was formed having as its inner surface the silicone-treated side. This bag was suspended in water and was taken out after 15 minutes and allowed to dry completely. The taste of the remaining water showed clearly that it contained sugar. When the bag and its contents were completely dry the contents were taken out by slight beating from outside. Of course the sugar had formed lumps but could easily be separated from the paper. The paper, however, remained very stiff. Sugar could easily be proved on the non-silicone-treated surface by licking the latter with the tongue.

When the dispersion method of the invention is employed the dispersion is applied to the paper from the sizing-press of the paper machine. When reaching the sizing-press the paper is already in sheets, it is carried free without any interleaving layers and retains a high percentage of water. As indicated by the name, the purpose of the sizing-press is to size the paper from one or both of its surfaces. Where both surfaces are sized the paper is drawn through a special liquid in a container while being kept beneath the surface of the liquid by an interleaving roll. Where only one surface is sized the paper is carried above the container from which the liquid is applied to the surface of the paper by continuous pumping. The surplus liquid runs off both paper surfaces into the container and from there into the storage container, from where it is pumped back to the paper machine. Normally the liquid is prepared in the storage container itself which is large enough to contain one day's batch. The storage container is usually equipped with an agitator. In up-to-date factories high-speed agitators are used, which can also be employed in preparing emulsions, such as the Ultra-Turrax-mixers. A closed mixer of this type is used to prepare the silicone dispersions of the invention to which there are added dispersing or emulsifying agents. The dispersion is pumped into the machine, and any surplus flows back into the mixer where the agitator is kept working all the time, thus preserving the dispersion. Great importance attaches to the temperatures. The room temperature in the sizing-press is about 30° C. to 40° C.; the paper itself, when coming into the press, has a temperature of about 60° to 70° C. It is therefore essential that a cooling system should be provided including the mixer, the tube system and the container in the sizing-press.

I. TREATMENT WITH SILICONE SOLUTIONS

Example 1

Paper such as parchment or pergamyn paper is drawn through an impregnating solution consisting of 3 parts by weight of silicone rubber, 3 parts by weight of silicone resin, .2 part by weight of hardening agents, 93.8 parts by weight of trichloroethylene. Advantageously a short heat impulse is applied after evaporation of the solvent. When 50 to 60 grams per sq. m. parchment is used the amount by weight of solution applied to each square meter of the paper may vary from .5 to 1.0 gram of silicone product, e.g., .6 gram of silicone product per square meter of paper may be applied. For the impregnation of close soda kraft paper the ratio of the silicone resin and silicone rubber dissolved in trichloroethylene should be 1:1, and there should be added 5% by weight of a hardening agent, based on the amount of the resin or rubber.

The silicone resin used is a methylsiloxane having an average of 1.15 methyl radicals per silicon atom and having a viscosity of 15 to 20 secs. measured in a Ford Cup No. 4, prepared according to United States Patent No. 2,842,521, issued July 8, 1958. The silicone rubber being a so-called "spreading mass" is a mixture of a hydroxy endblocked dimethylpolysiloxane having a viscosity of about 30,000 cs. at 25° C., and of diatomaceous earth sold as "Superfloss" by Johns-Manville Corporation, in the proportion of 2:1, and the hardening agent is a mixture of equal weights of tetraethoxy silane and dibutyl tin dilaurate.

The proportion of silicone resin to silicone rubber can be reduced to such an extent that there are not more than approximately 3 parts of resin per 10 parts of rubber and vice versa.

Further compositions are prepared as follows:

Example 2

6 parts by weight of the silicone resin (50% in toluene) of Example 1 and 3 parts by weight of silicone rubber spreading mass of Example 1 are diluted with perchloroethylene to 100 parts by weight, and .3 part by weight of a mixture of equal weights of tetraethoxy silane and dibutyl tin dilaurate are added.

Example 3

2 parts by weight of the silicone resin (50% in toluene) of Example 1 and 3 parts by weight of silicone rubber spreading mass of Example 1 are diluted with trichloroethylene to 80 parts by weight, 20 parts of butanol are added in order to increase the "pot time." Finally .1 part by weight of each of the following products are added: Methylhydrogenpolysiloxane fluid (viscosity about 5,000 cs. at 25° C.), as cross-linking agent, and dibutyl tin dilaurate as catalyst.

Example 4

A composition is prepared consisting of 10 parts by weight of the methylsilicone resin of Example 1 (50% in toluene), 3 parts by weight of the silicone rubber spreading mass of Example 1, .16 part by weight of methylhydrogenpolysiloxane, and .16 part by weight of dibutyl tin dilaurate and is diluted with perchloroethylene to 100 parts by weight.

II. TREATMENT WITH SILICONE DISPERSIONS

Example 5

3 parts of a solution mixture consisting of 70 parts of test gasoline, 15 parts of methylsilicone resin, 15 parts of methyl silicone rubber (hydroxy endblocked) and 1 part of a mixture of equal amounts of tetraethyl silicate and dibutyl tin dilaurate are dispersed in 97 parts of a 3% aqueous solution of carboxy methyl cellulose. The dispersion obtained can be used to treat paper during its manufacture in the sizing-press of the paper machine.

The silicone resin used, as mentioned above, was the methylsiloxane resin of Example 1, which is a 50% solution in toluene. Therefore the toluene is allowed to evaporate slowly from the silicone resin at 50° C. Subsequently a 50% by weight solution in perchloroethylene is prepared. The stabilizing agent used was carboxy methyl cellulose (CMC).

In order that the CMC is not dissolved again in water after the paper has been coated the CMC film is made water-soluble through the addition of suitable binding and fixing agents. Suitable fixing agents include condensation products of epichlorohydrin with aliphatic amines such as "Acrafix FH" sold by Farbenfabriken Bayer A.G. and employed together with coloring pigments in the dyeing industry. Dispersion is effected in two stages. First, a condensate of epichlorohydrin and an aliphatic amine is agitated in the prescribed amount of water. Then CMC is added, and the mixture is agitated in the high-speed agitator until the CMC is completely dissolved, which occurs very slowly. The CMC swells only superficially, and the swell layer has to be continually removed through fast agitation until complete solution has been achieved. The solution becomes slightly cloudy.

The use of other fixing agents for the CMC such as precondensates of ureaformaldehyde added as aqueous pastes result in films which are far less water-resistant than films produced with the epichlorohydrin-aliphatic amine condensate. Moreover, fixing with the aqueous paste of ureaformaldehyde precondensate can only be achieved in heat while with the epichlorohydrin-aliphatic amine condensate fixing occurs at room temperature. This is shown by an increase in viscosity after the mixture has been allowed to stand for various periods of time. A further advantage of the epichlorohydrin-aliphatic amine fixing agent is that the epichlorohydrin-aliphatic amine fixing agent-CMC-mixture can be dosed within a certain range, e.g. the following viscosities can be obtained:

An aqueous solution containing 95 parts of water, 3 parts of CMC, and 2 parts of a condensate of epichlorohydrin and an aliphatic amine after dissolving has the same viscosity as a solution containing 98.75 parts of water, .75 part of CMC, and .5 part of a condensate of epichlorohydrin and an aliphatic amine after having been allowed to stand for about 8 hours at room temperature. Condensation of this mixture will be considerably accelerated by heat. A film on glass produced in this way is practically water-resistant, only a slight swelling will occur. Films on glass prepared with the ureaformaldehyde paste and condensed in a warming cupboard will in the long run not be water-resistant.

After the CMC epichlorohydrin-aliphatic amine condensate fixing agent mixture has been prepared the silicones are dissolved, if the term solution may altogether be applied to silicone rubber. The solvents used are trichloroethylene or perchloroethylene, and methylhydrogenpolysiloxane fluid of 5,000 cs. viscosity at 25° C. and dibutyl tin dilaurate, which are not affected by acids, are added. Finally the emulsifying agent is added.

The emulsifiers employed are of various types, such as polyoxyethylene sorbitan fatty acid esters, alkylaryl sulfonates, triethanol amine oleates and ammonium salts of fatty acids of 14 to 18 carbon atoms. The emulsifier is required in very small amounts only; usually 1 part of emulsifier per 100 parts of perchloroethylene will be sufficient. With particular advantage emulsifiers are used which have a paraffin-like consistency, and whose melting point is therefore above the temperature at which silicone-treated paper is usually applied, e.g. above 60° C. The composition described above is emulsified in the CMC epichlorohydrin-aliphatic amine condensate fixing agent mixture.

Further compositions were prepared according to the above method as follows:

Example 6

835 parts by weight of water
20 parts by weight of epichlorohydrin-aliphatic amine condensate fixing agent
25 parts by weight of carboxymethyl cellulose
30 parts by weight of silicone rubber spreading mass
10 parts by weight of methylsiloxane resin having an average methyl to silicon ratio of 1.15/1, viscosity 15–20 secs. measured in a Ford Cup No. 4 (50% solution in perchloroethylene)
80 parts by weight of perchloroethylene 1000 parts by weight .8 part by weight of methylhydrogensiloxane fluid of 5,000 cs. viscosity at 25° C.
.8 part by weight of dibutyl tin dilaurate
1.6 parts by weight of emulsifier The hardening agent as well as the emulsifying agent are mentioned at the end since the compositions are calculated to 1,000 parts and the latter products do not affect the proportions in the composition.

The composition contained the following percentages:

| | Percent |
|---|---|
| Silicone rubber | 3.0 |
| Silicone resin | .5 |
| CMC+condensate of epichlorohydrin and aliphatic amine | 4.5 |
| Perchloroethylene | 8.0 |

*Example 7*

840 parts by weight of water
20 parts by weight of condensate of epichlorohydrin and aliphatic amine as fixing agent
25 parts by weight of CMC
55 parts by weight of perchloroethylene
10 parts by weight of silicone rubber spreading mass
50 parts by weight of methylsiloxane resin having an average methyl to silicon ratio of 1.15/1, viscosity 15–20 secs. measured in a Ford Cup No. 4 (50% solution in perchloroethylene)

1000 parts by weight

.8 part by weight of methylhydrogenpolysiloxane fluid of 5,000 cs. viscosity at 25° C.
.8 part by weight of dibutyl tin dilaurate
1.6 parts by weight of emulsifier The composition contained the following percentages:

| | Percent |
|---|---|
| Silicone rubber | 1.0 |
| Silicone resin | 2.5 |
| CMC+condensate of epichlorohydrin and aliphatic amine | 4.5 |
| Perchloroethylene | 8.0 |

The compositions of Examples 6 and 7 have viscosities of approximately 20 secs. measured in a DIN Cup No. IV.

To prepare the following compositions, a CMC condensate of epichlorohydrin and aliphatic amine solution is kept standing for a certain period of time, then the silicones are emulsified therein. Prior to the emulsifying process the viscosities are approximately 16 to 18 secs. measured in a DIN Cup No. IV.

*Example 8*

865 parts by weight of water
7 parts by weight of condensate of epichlorohydrin and aliphatic amine
9 parts by weight of CMC
30 parts by weight of silicone rubber spreading mass
10 parts by weight of methylsiloxane resin having an average methyl to silicon ratio of 1.15/1, viscosity 15–20 secs. measured in a Ford Cup No. 4 (50% solution in perchloroethylene)
79 parts by weight of perchloroethylene 1000 parts by weight .8 part by weight of methylhydrogenpolysiloxane fluid of 5,000 cs. viscosity at 25° C.
.8 part by weight of dibutyl tin dilaurate
1.6 parts by weight of emulsifier The composition contained the following percentages:

| | Percent |
|---|---|
| Silicone rubber | 3.0 |
| Silicone resin | .5 |
| CMC+condensate of epichlorohydrin and aliphatic amine as fixing agent | 1.6 |
| Perchloroethylene | 8.5 |

*Example 9*

870 parts by weight of water
7 parts by weight of condensate of epichlorohydrin and aliphatic amine as fixing agent
9 parts by weight of CMC
54 parts by weight of perchloroethylene
10 parts by weight of silicone rubber spreading mass
50 parts by weight of methylpolysiloxane resin having an average methyl to silicon ratio of 1.15/1, viscosity 15–20 secs. measured in a Ford Cup No. 4 (50% solution in perchloroethylene)

1000 parts by weight

.8 part by weight methylhydrogenpolysiloxane fluid of 5,000 cs. viscosity at 25° C.
.8 part by weight dibutyl tin dilaurate
1.6 parts by weight of emulsifier The composition contained the following percentages:

| | Percent |
|---|---|
| Silicone rubber | 1.0 |
| Silicone resin | 2.5 |
| CMC+condensate of epichlorohydrin and aliphatic amine as fixing agent | 1.6 |
| Perchloroethylene | 8.0 |

Papers treated with the solutions of Examples 1 to 4, or with the dispersions of Examples 5 to 9 exhibited excellent release properties, water repellent properties, grease resistance and wet strength.

That which is claimed is:

1. A process for preparing non-adherent paper characterized in that the paper fibers are treated with a mixture of (1) room temperature vulcanizing silicone rubber stock comprising (a) 100 parts by weight of an organosiloxane polymer of the formula $XO[R_2SiO]_nX$ wherein each R is an organic radical selected from the group consisting of alkyl and aryl radicals, each X is selected from the group consisting of hydrogen atoms, alkyl radicals and aryl radicals and $n$ is at least 50, (b) 50–200 parts inorganic filler, (c) 0.5 to 10 parts cross-linking agent and (d) 0.1 to 5 parts condensation catalyst and (2) a silicone resin fluid consisting essentially of units of the formulae $RSiO_{3/2}$ and $R_2SiO$ where R is as above defined, the average R/Si ratio in said resin being in the range from 1.0/1 to 1.7/1.

2. The process of claim 1 wherein the paper fibers are impregnated with the mixture.

3. The process of claim 1, wherein the mixture of (1) room temperature vulcanizing silicone rubber and (2) silicone resin is applied to the paper as a solution in an organic solvent.

4. The process of claim 3 wherein the organic solvent employed is a chlorinated aliphatic hydrocarbon.

5. The process of claim 1 wherein the mixture of (1) room temperature vulcanizing silicone rubber and (2) silicone resin is applied as an aqueous dispersion.

6. The process of claim 5 wherein the aqueous dispersion is prepared with the aid of carboxymethylcellulose.

7. The process of claim 6 wherein a fixing agent for the carboxymethylcellulose is incorporated in the aqueous dispersion.

8. The process of claim 5 wherein the aqueous dispersion is prepared with the aid of an emulsifying agent.

9. The process of claim 1 wherein the cross-linking agent (1) (c) is selected from the group consisting of tetraethoxy silane and methylhydrogenpolysiloxane.

10. The process of claim 1 wherein the condensation catalyst (1) (d) is dibutyl tin dilaurate.

11. The process of claim 1 wherein the mixture contains from .16 to 6 parts of the silicone rubber (1) to 1.0 part of silicone resin (2).

References Cited in the file of this patent

UNITED STATES PATENTS

| 2,645,629 | Nitzsche | July 14, 1953 |
| 2,744,079 | Kilbourne | May 14, 1956 |
| 2,814,601 | Currie et al. | Nov. 26, 1957 |
| 2,875,098 | Blatz | Feb. 24, 1959 |

UNITED STATES PATENT OFFICE

CERTIFICATE OF CORRECTION

Patent No. 3,046,160

July 24, 1962

Ludwig Dengler

It is hereby certified that error appears in the above numbered patent requiring correction and that the said Letters Patent should read as corrected below.

In the heading to the printed specification, line 8, for "Claims priority, application Germany Apr. 30, 1958" read -- Claims priority, application Switzerland Apr. 30, 1958 --.

Signed and sealed this 18th day of June 1963.

(SEAL)
Attest:

ERNEST W. SWIDER
Attesting Officer

DAVID L. LADD
Commissioner of Patents